United States Patent
O'Neill

(10) Patent No.: US 8,566,718 B1
(45) Date of Patent: *Oct. 22, 2013

(54) LIVE DEMONSTRATION OF COMPUTING DEVICE APPLICATIONS

(75) Inventor: Thomas G. O'Neill, Mountain View, CA (US)

(73) Assignee: Google Inc., Mountain View, CA (US)

( * ) Notice: Subject to any disclaimer, the term of this patent is extended or adjusted under 35 U.S.C. 154(b) by 283 days.

This patent is subject to a terminal disclaimer.

(21) Appl. No.: 13/194,555

(22) Filed: Jul. 29, 2011

Related U.S. Application Data

(60) Provisional application No. 61/421,947, filed on Dec. 10, 2010.

(51) Int. Cl.
| | |
|---|---|
| G06F 3/00 | (2006.01) |
| G06F 3/048 | (2013.01) |
| G06F 17/00 | (2006.01) |
| G06F 9/44 | (2006.01) |
| G06F 13/10 | (2006.01) |
| G06F 13/12 | (2006.01) |
| G06F 9/45 | (2006.01) |

(52) U.S. Cl.
USPC ........... 715/709; 715/705; 715/706; 715/730; 715/758; 700/234; 703/21; 703/22

(58) Field of Classification Search
USPC ............... 700/234; 703/21, 22; 715/705, 706, 715/709, 730, 758
See application file for complete search history.

(56) References Cited

U.S. PATENT DOCUMENTS

| | | | |
|---|---|---|---|
| 5,442,759 A | 8/1995 | Chiang et al. | |
| 5,493,658 A | 2/1996 | Chiang et al. | |
| 5,513,316 A * | 4/1996 | Rodrigues et al. | 714/38.13 |
| 5,745,738 A * | 4/1998 | Ricard | 703/13 |
| 5,848,378 A | 12/1998 | Shelton et al. | |
| 5,892,947 A * | 4/1999 | DeLong et al. | 717/100 |
| 6,020,886 A | 2/2000 | Jacober et al. | |
| 6,100,886 A | 8/2000 | Lin | |
| 6,340,977 B1 | 1/2002 | Lui et al. | |
| 6,857,103 B1 | 2/2005 | Wason | |
| 7,086,032 B2 | 8/2006 | Nirell et al. | |

(Continued)

OTHER PUBLICATIONS

Bjorklid, Karl-Mikael, 'Unit Testing with Monkeys,' University of Jyväskylä, Department of Mathematical Information Technology, Oct. 21, 2002, 6 pages.

(Continued)

*Primary Examiner* — Kieu Vu
*Assistant Examiner* — Eric J Bycer
(74) *Attorney, Agent, or Firm* — Morris & Kamlay LLP

(57) ABSTRACT

A feature of a computing device application may be selected by user or other input and then demonstrated using a demonstration application. The demonstration application may select simulated user inputs from a script or other source that, when input to the computing device application, drive it to demonstrate the selected feature. The demonstration application may then begin to input the one or more simulated user inputs to the computing device application. Before all of the simulated user inputs have been input, the demonstration application may determine that the user has interrupted the demonstration. In response to the determination, the demonstration application may cease inputting the simulated inputs, leaving the computing device application in the state it was in at the time of interruption, thereby enabling the user to explore the application or feature of the application being demonstrated at a time and in a manner of the user's choosing.

21 Claims, 4 Drawing Sheets

(56) References Cited

U.S. PATENT DOCUMENTS

| | | | |
|---|---|---|---|
| 7,373,636 B2 * | 5/2008 | Barry et al. | 717/124 |
| 7,828,216 B2 * | 11/2010 | Fok et al. | 235/472.02 |
| 2004/0268225 A1 | 12/2004 | Walsh et al. | |

OTHER PUBLICATIONS

Office Action for U.S. Appl. No. 13/249,596, dated Jan. 27, 2012, 15 pages.

* cited by examiner

LIVE DEMONSTRATION OF COMPUTING DEVICE APPLICATIONS

CROSS-REFERENCE TO RELATED APPLICATION

This application claims the benefit of U.S. Pat. App. No. 61/421,947, filed Dec. 10, 2010, which is incorporated herein by reference.

BACKGROUND

The present application relates to computing devices and, in one particular implementation, to a system and method for live demonstration of features of computing device applications.

Effective demonstration of computing device applications is problematic. Demonstration modes involving movies fail to convince potential users of the value of the application being demonstrated because users are generally aware that movies can misrepresent the manner in which the application functions. Movies also lack interactivity, frustrating users by preventing them from exploring the particular features of an application in which they are most interested. Scripted demonstration modes can be similarly frustrating in that they prevent users from interrupting the demonstration as a script moves the demonstrated application through a set series of operations, thereby depriving users of the opportunity to explore features of interest.

SUMMARY

An effective demonstration of an application of a computing device, which may be, for example, an application of a mobile device such as a smart phone, can be achieved by driving the application through a series of steps that demonstrate one or more features that may be of interest to a user. The application being demonstrated can be driven through these steps by a demonstration application that preserves the ability of the user to interact with the application being demonstrated, thereby providing a "live" demonstration that is more compelling than demonstration through a movie or a canned script.

The demonstration application may, for example, allow a user to select one or more features of the computing device application to demonstrate, so as to tailor the demonstration to the interests of the user. The demonstration application may then allow the user to interrupt the demonstration while it is in progress, so as to enable interaction with the application being demonstrated. For example, a user may choose to interrupt the demonstration by providing an input, at which point the demonstration application may leave the application being demonstrated in the state it was at at the time of the interruption. The user can then freely explore the application that was being demonstrated, until such time as resumption of the demonstration is triggered. The demonstration may resume from a known state of the application being demonstrated, for example, following an additional user input, or following a period of user inactivity.

The demonstration application may, in the absence of user input, automatically select one or more features of one or more computing device applications to demonstrate, and may demonstrate those features in a continuous loop. The demonstration application may, for example, enter an automatic demonstration mode following an extended period of user inactivity. The demonstrations provided during such an automatic demonstration mode may still be live, enabling a user to interrupt a demonstration and to interact with an application being demonstrated in the manner described above.

According to one innovative aspect of the subject matter described by this specification, a feature of a computing device application may be selected by user or other input and then demonstrated using a demonstration application that drives the computing device application through a series of steps demonstrating the selected feature. The demonstration application may receive user input that references the feature to be demonstrated. For example, the user may select a menu option. Alternately, the demonstration application may automatically select the feature to be demonstrated. The demonstration application may be configured to select one or more simulated user inputs, such as key, touch, or other events, that, when input to the computing device application, drive it to demonstrate the selected feature. The demonstration application may select the simulated user inputs, from among multiple sets of simulated user inputs, from a script or other source. The demonstration application may then begin to input the one or more simulated user inputs to the computing device application.

According to another innovative aspect, the demonstration application may be configured to determine, after beginning to input the simulated user inputs to the computing device application but before all of the simulated user inputs have been input, that the user has interrupted the demonstration of the selected feature. The determination may be based on the receipt of one or more user inputs. In response to the determination, the demonstration application may be configured to cease inputting the simulated inputs to the application, leaving the computing device and/or computing device application in the state it was in at the time of interruption, thereby enabling the user to explore the application or feature of the application being demonstrated at a time and in a manner of the user's choosing.

According to another innovative aspect, the demonstration application may be configured to, in response to selecting simulated user inputs, automatically obtain real-time information by the computing device and to input the real-time information to the computing device application before determining that the user has interrupted the demonstration of the selected feature. This real-time information may include, for example, weather, location, time, sensor, or traffic information that is current when the simulated user inputs are selected.

According to another innovative aspect, the demonstration application may be configured to determine whether or not the selected feature is capable of being demonstrated from a current state of the computing device or computing device application, before beginning to input the one or more simulated inputs. If the feature is not capable of being demonstrated, or if it would otherwise be advantageous to do so, the demonstration application may place the computing device or computing device application in a known state before beginning to input the one or more simulated user inputs.

According to another innovative aspect, the demonstration application may be configured to determine, after ceasing to input the simulated user inputs to the computing device application, that the user has selected another feature of the application to demonstrate. The demonstration application may then be configured to select other simulated user inputs that, when input to the application, drive the application to demonstrate the other feature, to begin inputting one or more of the other simulated user inputs to the application, to determine before all of the other simulated user inputs have been input to the computing device application that the user has interrupted the demonstration of the other feature, and to cease inputting the other simulated inputs to the application based on that determination.

Other embodiments of these aspects include corresponding systems, apparatus, and computer programs, configured to perform the actions of the methods, encoded on computer storage devices.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

A demonstration application may be configured to interact with one or more other applications in order to provide live demonstrations of features of the other applications. A live demonstration may involve driving an application of a computing device, which may be, for example, an application of a mobile device such as a smart phone or a personal data assistant, through a series of steps that demonstrate one or more features that may be of interest to a user, while preserving the ability of the user to interact with application being demonstrated.

The demonstration application may, for example, allow the user to interrupt the demonstration while it is in progress, so as to enable interaction with the application being demonstrated. For example, a user may choose to interrupt the demonstration by providing an input, at which point the demonstration application may leave the application being demonstrated in the state it was at at the time of the interruption. The user may then freely explore features of the application that was being demonstrated, until such time as resumption of the demonstration is triggered.

Figure 1:
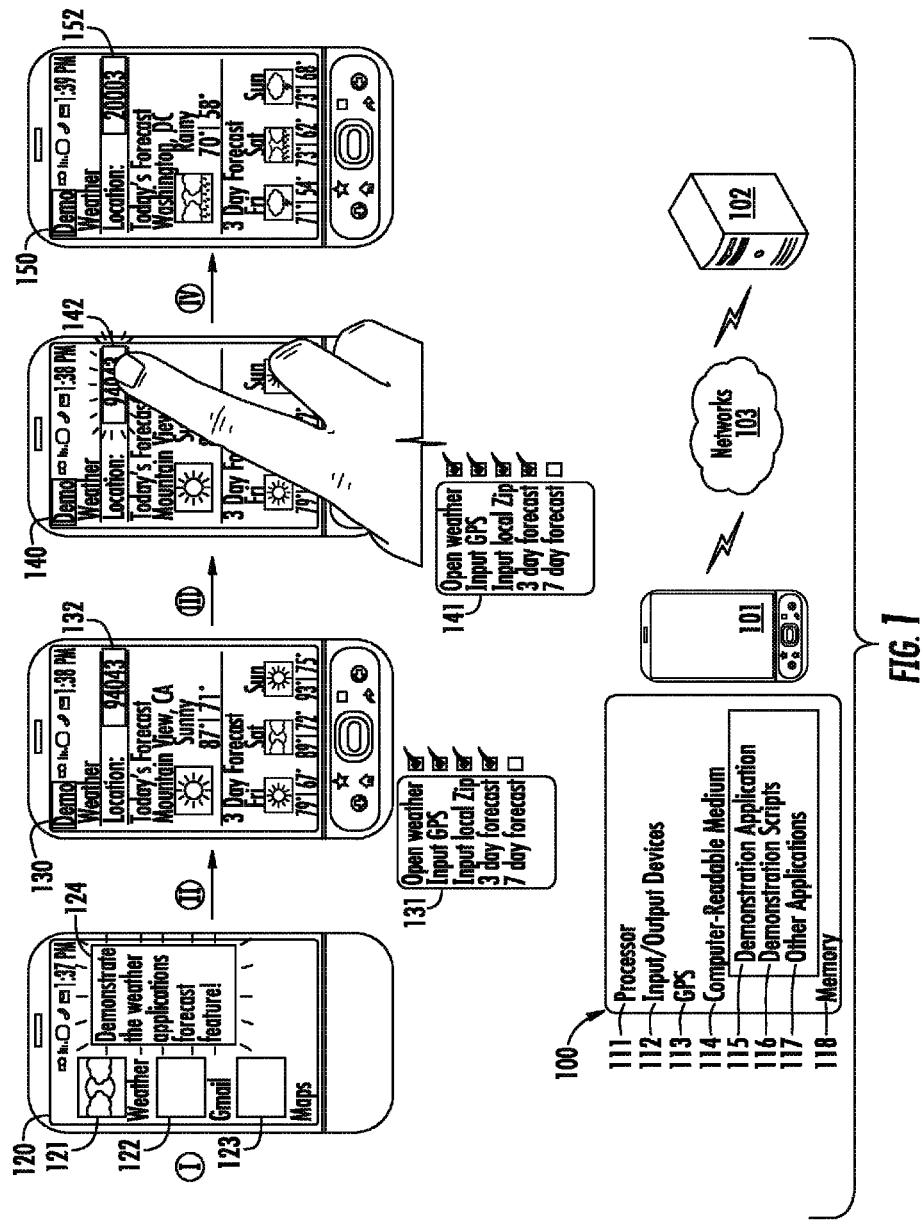
FIG. 1 features a diagram of an example system for demonstrating computing device applications as well as example screenshots of a demonstration of an application.

FIG. 1 features a diagram of an example system for demonstrating computing device applications. Specifically, the system 100 includes a computing device 101 that is configured to run a demonstration application 115, which is configured to enable the live demonstration of one or more specific features of one or more other applications 117. The one or more other applications are separate from the demonstration application and have one or more specific features enabling a user of the computing device to perform specific tasks and/or to obtain specific information. Although demonstration application 115 may not require a network connection in order to demonstrate certain features of the other applications 117, the system 100 further includes a server 102 from which data can be obtained, and one or more networks 103. The computing device 101 and the server 102 may communicate with each other over the one or more networks 103.

The computing device 101 may be any type of computing device, such as a cellular phone, smart phone, personal data assistant, notebook computer, tablet computer, or desktop computer. The computing device 101 includes one or more processors 111, one or more input/output devices 112, and one or more computer-readable media such as computer-readable medium 114. Computer-readable medium 114 may store a demonstration application 115, one or more demonstration scripts 116, and one or more other applications 117.

The computing device 101 may also include one or more hardware or software components that provide additional functionality, such as Global Positioning System (GPS) component 113. Although the computing device 101 is depicted in FIG. 1 as having a GPS component 113, components that provide additional functionality, such as GPS component 113, are only necessary for demonstration scripts 116 that require the additional functionality. As such, components such as GPS component 113 are optional. The computing device 101 may also include hardware and software components in addition to the components listed here and depicted in FIG. 1.

The server 102 may be any computing device that includes one or more processors. The server 102 may be implemented in one or more devices, arranged, for example, as a stand-alone server, a server farm, or a server cluster.

The networks 103 may include a wireless cellular network, a wireless local area network (WLAN) or Wi-Fi network, a telephone network, a Third Generation (3G) or Fourth Generation (4G) mobile telecommunications network, a private network such as an intranet, a public network such as the Internet, or any appropriate combination thereof.

The user may interact with the demonstration application 115 using the one or more input/output devices 112 of the computing device 101 in order to experience a demonstration of one or more of the features of one or more other applications 117 stored on computer-readable medium 114. For example, the demonstration application may receive user input, such as a touch, key, or other event indicating the user's selection of a menu option, from the one or more input devices 112 that references the feature of one of the other applications 117 to be demonstrated.

Alternately, in the absence of user input, the demonstration application 115 may automatically select one or more features of one or more other applications 117 to demonstrate. The demonstration application 115 may, for example, enter an automatic demonstration mode following an extended period of user inactivity.

In response to user or automatic selection of a feature of one of the other applications 117 to be demonstrated, the demonstration application 115 may select one or more simulated user inputs, such as key, touch, or other events, that, when input to the other application having the selected feature, drives the other application to demonstrate the selected feature. The demonstration application 115 may select the simulated user inputs, from among multiple sets of simulated user inputs, by interacting with one or more demonstration scripts 116 stored on computer-readable medium 114, or by interacting with another source of simulated user inputs, such as server 102.

Following the selection of the simulated user inputs, the demonstration application 115 may determine whether or not the selected feature is capable of being demonstrated from a current state of the computing device 101 or of the other application 117. If the feature is not capable of being demonstrated, or if it would otherwise be advantageous to do so, the demonstration application 115 may then place the computing device 101 or the other application 117 into a known state. The demonstration application 115 may, for example, reset the computing device 101 by returning it to an initial state.

In addition, the demonstration application 115 may, in response to selecting simulated user inputs, automatically obtain real-time information from one or more hardware or software components of the computing device 101 such as GPS 113, or from another source such as server 102. The obtained real-time information may comprise, for example, weather, location, time, sensor, or traffic information that is current when the simulated user inputs are selected. After obtaining the real-time information, the demonstration application 115 may input the real-time information to the other application 117. In some instances, however, the other application 117 being demonstrated may itself obtain real-time information, without relying on input from the demonstration application 115.

After selecting the simulated user inputs, the demonstration application 115 may begin to input the selected simulated user inputs to the other application 117, driving the other application 117 to demonstrate the selected feature. The demonstration application 115 may be configured to determine, after beginning to input the selected simulated user inputs to the other application 117 but before all of the selected simulated user inputs have been input, that the user has interrupted the demonstration of the selected feature.

The determination that the user has interrupted the demonstration may be based on detecting one or more user inputs such as a key, touch, or other events, received through one of the input devices 112 of computing device 101. In response to the determination that the user has interrupted the demonstration, the demonstration application 115 may be configured to cease inputting the selected simulated user inputs to the other application 117, leaving the computing device 101 and/or other application 117 in the state they were in at the time of interruption, thereby enabling the user to explore the other application 117 or feature of the other application 117 being demonstrated at a time and in a manner of the user's choosing.

The demonstration application 115 may be further configured to determine, after ceasing to input the simulated user inputs to the other application 117, that the user has selected another feature of one of the other applications 117 to demonstrate. The determination that the user has selected another feature of one of the other applications 117 to demonstrate may be based on detection of user input, such as a touch, key, or other input event, from the one or more input devices 112 that references the other feature of one of the other applications 117 to be demonstrated. The demonstration application 115 may also be configured to automatically select another feature of one of the other applications 117 to demonstrate after an extended period of user inactivity.

The demonstration application 115 may then select one or more other simulated user inputs that, when input to one of the other applications 117, drive one of the other applications 117 to demonstrate the selected other feature. The one or more other simulated user inputs may be selected, for example, from one or more of the demonstration scripts 116 or from another source such as server 102.

As described above, the demonstration application 115 may be further configured to determine whether the other feature is capable of being demonstrated from a current state of the computing device 101 and/or of the other application, to obtain and input-real time information in response to the selection of the other simulated user inputs, to begin to input one or more of the selected other simulated user inputs to the other application, to determine before all of the selected other simulated user inputs have been input to the other application that the user has interrupted the demonstration of the other feature, and to cease inputting the selected other simulated user inputs in response to the determination that the user has interrupted the demonstration of the other feature.

FIG. 1. also illustrates four example screenshots, 120, 130, 140, and 150, that are displayed on the computing device 101 during example states (I), (II), (III), and (IV), respectively. Together, these four screenshots provide an example of a demonstration of a computing device application. The example states (I), (II), (III), and (IV) may be time-sequenced states, or they may occur in a sequence that is different than the illustrated sequence.

In more detail, at state (I), depicted by screenshot 120, the user has, through the demonstration application 115, selected a feature of one of the other applications 117 of the computing device 101 to demonstrate. In this case, the user has selected the forecast feature of the weather application.

The user has selected the forecast feature by touching the portion of the screen of the computing device 101, one of the computing device's input devices 112, corresponding to button 124. However, selection of the feature to demonstrate could have occurred automatically following an extended period of user inactivity, or could have occurred by other means. Selection of the feature could have occurred, for example, through one or more user key, touch, or other input events, or through input received from server 102.

In addition to icon 121, corresponding to the weather application, screenshot 120 features additional icons 122 and 123. These additional icons 122 and 123 correspond to additional other applications 117 with additional features that the demonstration application 115 might be used to demonstrate.

In some instances, a single demonstration might involve multiple other applications. For example, the weather application may be configured to provide a forecast for a location selected using the maps application. As such, a demonstration of the weather application's forecast feature might involve both the weather application and the maps application.

At state (II), depicted by screenshot 130, in response to the user's selection of the forecast feature of the weather application, the demonstration application 115 has selected several simulated user inputs that, when input to the weather application, demonstrate the forecast feature In this example, demonstration application 115 has selected the simulated user inputs by loading the forecast demonstration script, one of the demonstration scripts 116 contained on computer-readable medium 114 of the computing device 101.

As indicated by list 131, the forecast demonstration script contains the following simulated user inputs: open weather, input GPS, input local zip, 3 day forecast, and 7 day forecast. In response to selecting these simulated user inputs, the demonstration application 115 has automatically obtained real-time location information from GPS 113 of computing device 101.

At state (II), as reflected by the checked boxes in list 131, the demonstration application 115 has begun to input the selected simulated user inputs to the weather application. The inputted simulated user inputs have driven the weather application to demonstrate the forecast feature by opening, receiving inputted real-time GPS coordinates from the demonstration application 115, inputting a local zip code corresponding to the received GPS coordinates into location field 132, and displaying a corresponding 3 day forecast. However, at state (II) the demonstration application 115 has yet to input all of the simulated user inputs to the weather application, as the simulated 7 day forecast has not been input.

At state (III), before the demonstration application 115 has input the final simulated user input to the weather application, the demonstration application 115 has determined that the user has interrupted the demonstration of the forecast feature by detecting that the user touched the portion of the screen of the computing device 101 corresponding to the location field 142.

However, the demonstration application 115 could have determined that an interruption had occurred through a different approach, for example through one or more user key, touch, or other input events, if it had been configured to do so. For example, upon detection of a user touch event, a message prompting the user for input confirming or denying the decision to exit the demonstration could have been displayed, and the demonstration application could determine that the user has interrupted the demonstration upon detecting a key or touch event confirming the decision to exit.

At state (III), based on the determination that the user has interrupted the demonstration of the forecast feature, the demonstration application 115 has ceased inputting the selected simulated user inputs from the forecast demonstration script 141 to the weather application. The weather application is left in the state it was in at the time of the user's interruption, enabling the user to explore the weather application and its features without being limited by the contents of the forecast demonstration script 141.

At state (IV), following the determination by the demonstration application 115 that the user has interrupted the demonstration of the forecast feature and the cessation based on that determination of inputting selected simulated user inputs to the weather application, the demonstration of the forecast feature has ended. Following the end of the demonstration, the user has inputted a new zip code into the location field 152, causing the weather application to display different forecast information corresponding to the new zip code.

The demonstration application 115 could determine, however, based on one or more key, touch, or other input events, that the user has selected another feature of one of the other applications 117 to demonstrate. Alternately, following an extended period of user inactivity, the demonstration application 115 could automatically select another feature of one of the other applications 117 to demonstrate.

The demonstration application 115 could then select one or more other simulated user inputs from one or more of the demonstration scripts 116 or from another source such as server 102 that, when input to one of the other applications 117, drive the other application to demonstrate the selected other feature. The ensuing demonstration would proceed in a manner substantially similar to the described demonstration of the forecast feature of the weather application.

Figure 2:
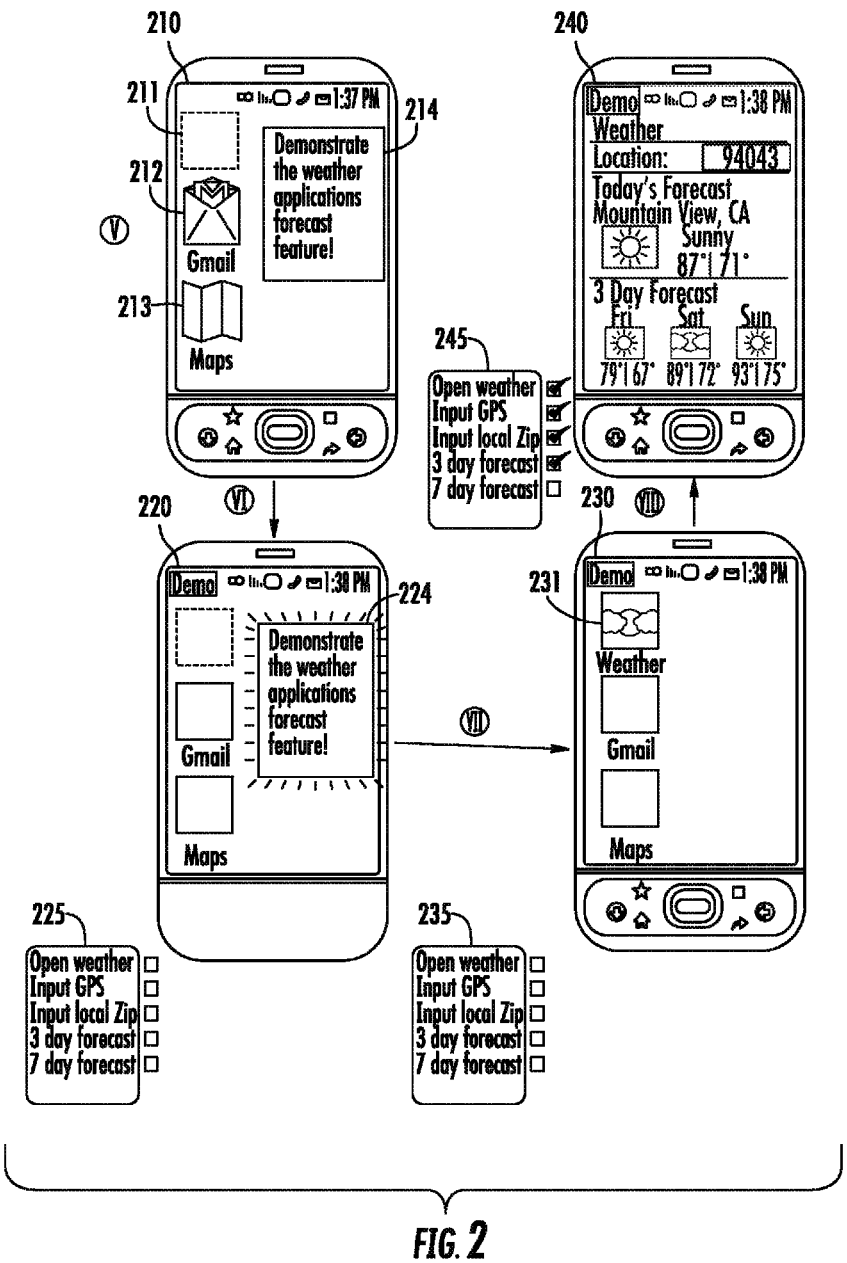
FIG. 2. shows example screenshots of placing a computing device in a known state before proceeding to demonstrate a computing device application.

FIG. 2 illustrates four example screenshots, 210, 220, 230, and 240, that are displayed on the computing device 101 during example states (V), (VI), (VII), and (VIII), respectively. Together, these four screenshots provide an example of placing a computing device in a known state before proceeding to demonstrate a computing device application. The example states (V), (VI), (VII), and (VIII) may be time-sequenced states, or they may occur in a sequence that is different than the illustrated sequence.

In more detail, at state (V), depicted by screenshot 210, the demonstration application 115 has displayed button 214, with a prompt indicating to the user that selection of the button 214 will result in a demonstration of the forecast feature of the weather application, one of the other applications 117 stored on computer-readable medium 114. However, although icons 212 and 213, corresponding to two of the other applications 117, are present in screenshot 210, missing is the icon 211 corresponding to the weather application.

At state (VI), depicted by screenshot 220, the user has, through the demonstration application 115, selected the forecast feature of the weather application to demonstrate. The user has selected the feature by touching the portion of the screen of the computing device 101 corresponding to button 224. In response to receiving this user input referencing the forecast feature of the weather application, the demonstration application 115 has selected simulated user inputs that, when input to the weather application, will drive the weather application to demonstrate the forecast feature, by loading the forecast demonstration script which contains the simulated user inputs appearing in list 225.

However, the first simulated user input appearing in list 225 is "open weather." Because the icon corresponding to the weather application is missing from the screen, the demonstration application 115 determines that the selected forecast feature of the weather application is incapable of being demonstrated from the current state of the computing device 101, because the demonstration application 115 cannot simulate opening the weather application. The determination could also have been made through a comparison between the current state of the computing device 101 to a known state of the computing device 101 from which the feature could be demonstrated.

At state (VII), depicted by screenshot 230, in response to the determination that the selected forecast feature of the weather application was incapable of being demonstrated from the then current state of the computing device 101, the demonstration application has placed computing device 101 in a known state, a state in which icon 231 corresponding to the weather application is displayed, before beginning to input the selected simulated user inputs appearing in list 235.

At state (VIII), depicted by screenshot 240, the demonstration application has automatically obtained real-time location information from GPS 113 of computing device 101 and, as reflected by checked boxes in list 245, has begun to input the selected simulated user inputs to the weather application, driving the weather application to demonstrate the forecast feature.

Figure 3:
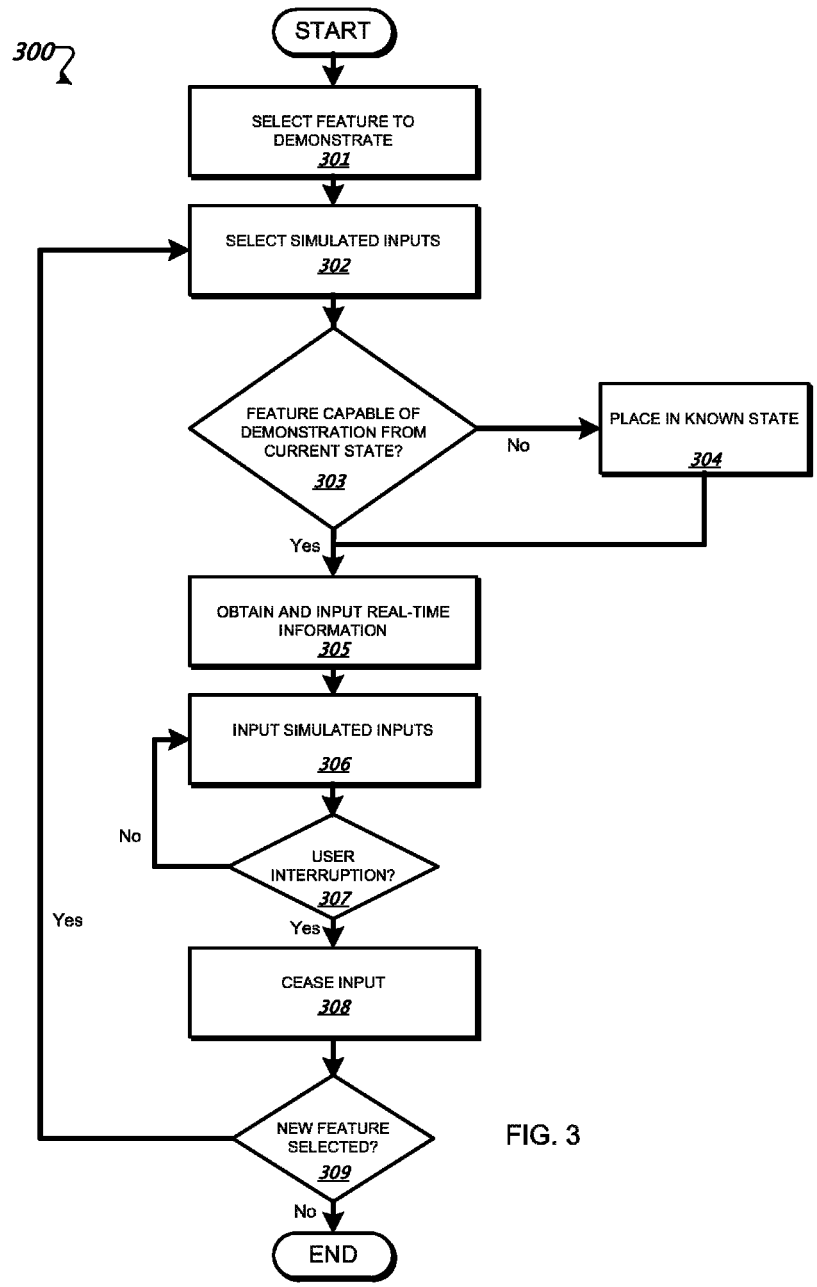
FIG. 3 is a flowchart of a process for live demonstration of computing device applications.

FIG. 3 is a flowchart of a process 300 for live demonstration of features of computing device applications. The process 300 may be implemented, for example, using system 100.

The process begins with the selection of a feature of an application of a computing device to demonstrate (301). The feature of the computing device application to be demonstrated may be selected by a user through, for example, key, touch, or other input events, or through other input received from another source such as, for example, a server or other computing device. In some instances, the feature to be demonstrated may be selected automatically by a demonstration application of the computing device following an extended period of inactivity. The feature to be demonstrated may be demonstrated through the demonstration application of the computing device, which may be configured to receive user or other input that references the feature.

Following the selection of a feature of a computing device application to demonstrate, the process proceeds with the selection of simulated user inputs that, when input to the computing device application, drive the computing device application to demonstrate the selected feature (302). Selection of the simulated user inputs may be performed by a demonstration application configured to select one or more simulated user inputs, such as key, touch, or other events, from among multiple sets of simulated user inputs. The simulated user inputs may be selected, for example, from a demonstration script contained in a computer-readable medium accessible by the computing device.

A determination may be made as to whether the selected feature is capable of being demonstrated from a current state of the computing device or computing device application (303). The determination may be made, for example, by the demonstration application based on a comparison between a current state of the computing device or computing device application and a known state of the computing device or computing device application.

If it is determined that the selected feature is not capable of being demonstrated from the current state of the computing device or computing device application, the demonstration application may place the computing device or computing device application into a known state (304). In some implementations the known state may be stored on a computer-readable medium of the computing device and may be accessed by the demonstration application of the computing device.

If the selected feature was determined as being capable of demonstration from a current state of the computing device or computing device application or, alternately, following the placement of the computing device or computing device application into a known state, the process may proceed by automatically obtaining real-time information by the computing device and by inputting the real-time information to the computing device application to be demonstrated (305).

In some implementations the real-time information may comprise weather, location, time, sensor, or traffic information that was current when the simulated user inputs were selected. Other kinds of real-time information may be obtained from the computing device and inputted as well, and the examples of weather, location, time, sensor, or traffic information are not meant to be exhaustive. In some implementations, the real-time information may be obtained and inputted by a demonstration application of the computing device based on an appraisal of the selected simulated user inputs.

The process may then proceed by inputting the one or more selected simulated user inputs to the computing device application (306). In some implementations, the one or more simulated user inputs are inputted by a demonstration application of the computing device.

After beginning to input the simulated user inputs to the computing device application, a determination may be made as to whether the user has interrupted the demonstration of the selected feature (307). In some implementations, the determination is made by a demonstration application of the computing device, and is based on receiving one or more user inputs.

If it is determined that the user has not interrupted the demonstration and if further selected simulated user inputs remain to be inputted to the computing device application, the process may then return to inputting remaining user inputs to the computing device application (306). In some implementations, the steps of inputting simulated user inputs (306) and determining whether the user has interrupted the demonstration (307) repeat until none of the selected simulated user inputs remain to be inputted to the computing device application, or until a determination is made that the user has interrupted the demonstration of the selected feature.

If a determination is made that the user has interrupted the demonstration of the selected feature the process may then proceed by ceasing to input the selected simulated user inputs to the computing device application (308). In some implementations, the computing device and/or the computing device application is then left in the state it was in at the time of the user interruption.

After input of the simulated user inputs to the computing device application ceases, either because the user has interrupted the demonstration or because no simulated user inputs remain to be inputted, the process may continue with a determination of whether another feature of a computing device application has been selected for demonstration(309). In some implementations this determination is made by a demonstration application of the computing device and is based on the receipt of one or more user inputs, such as key, touch, or other user input events. Alternately, selection of another feature to demonstrate may occur automatically following a prolonged period of user inactivity, and the determination may occur based on the automatic selection.

If the determination is made that selection of another feature of a computing device application to demonstrate has occurred, the process may then return to step (302), in which other simulated user inputs may be selected that, when input to a computing device application, drive the computing device application to demonstrate the other feature. In some implementations the selection of the other simulated user inputs is performed by a demonstration application of the computing device. Following the selection of the other simulated user inputs, the process for live demonstration of features of computing device applications may continue from step (302), as described above.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Figure 4:
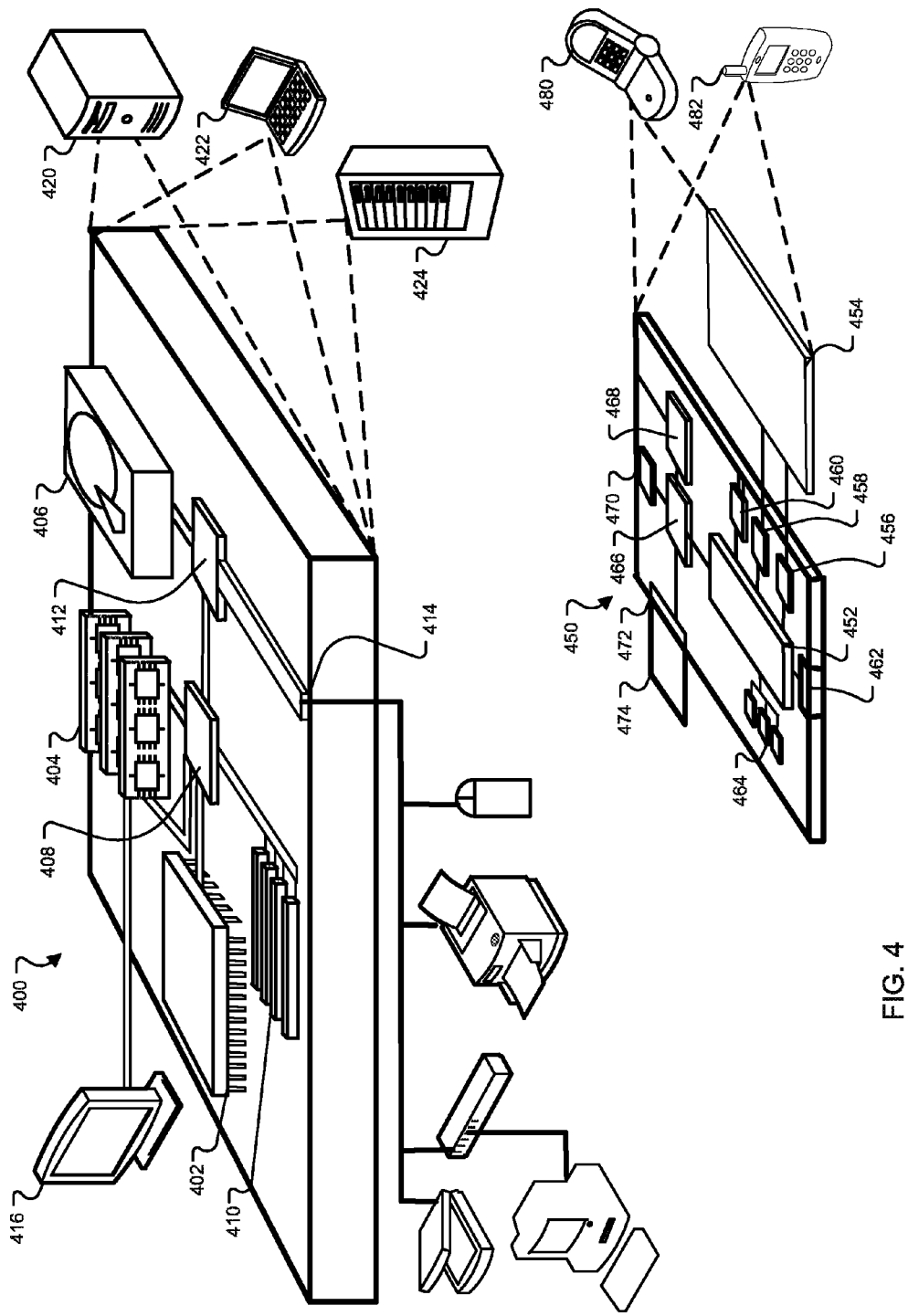
FIG. 4 shows example computing devices which may be used to provide live demonstrations of computing device applications.

FIG. 4 shows an example of a generic computer device 400 and a generic mobile computer device 450, which may be used to implement the processes described herein. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable medium, such as the memory 404, the storage device 406, memory on processor 402, or a propagated signal. For example, the information carrier may be a non-transitory, machine-readable storage medium.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a manner that is not modifiable by the end-user.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, COMA, TDMA, PDC, WCDMA, CDMA2000, or GPRS, among others. Such communication may occur, for example, through radio-frequency transceiver 468. In addition, short-range communication may occur, such as using a Bluetooth®, Wi-Fi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A computer-implemented method comprising:
    selecting a feature of an application on a computing device to demonstrate;
    selecting simulated user inputs that, when input to the application, drive the application to demonstrate the selected feature;
    driving the application from a first application state to a second application state by inputting a first subset of the simulated user inputs to the application;
    determining, while the application is in the second application state, that a user has entered one or more actual user inputs, then ceasing to input any further simulated user inputs to the application, and driving the application from the second application state to a third application state by inputting one or more of the actual user inputs; and
    determining that the user has not entered any further actual user inputs for a predetermined period of time, then driving the application by inputting a second subset of the simulated user inputs to the application.

2. The method of claim 1, wherein the simulated user inputs are selected, from among multiple sets of simulated user inputs, by a demonstration application of the computing device.

3. The method of claim 1, further comprising:
    in response to selecting the simulated user inputs, automatically obtaining real-time information, by the computing device; and
    before determining that the user has entered one or more actual user inputs, inputting the real-time information to the application.

4. The method of claim 3, wherein the real-time information comprises weather, location, time, sensor, or traffic information that is current when the simulated user inputs are selected.

5. The method of claim 1, wherein selecting the feature further comprises receiving a user input that references the feature.

6. The method of claim 1, further comprising:
    receiving the one or more actual user inputs for interrupting the driving the application to demonstrate the selected feature, wherein determining that the user has entered one or more actual user inputs comprises determining that the one or more actual user inputs have been received.

7. The method of claim 1, further comprising:
placing the application or computing device in a known state before beginning to input the first subset of the selected simulated user inputs.

8. The method of claim 1, further comprising:
determining whether the selected feature is capable of being demonstrated from a current state of the application or computing device, before beginning to input the first subset of the simulated user inputs.

9. The method of claim 1, further comprising:
determining, after ceasing to input any further simulated user inputs to the application, that the user has selected another feature of the application to demonstrate;
selecting a third subset of the simulated user inputs that, when input to the application, drive the application to demonstrate the other feature;
beginning to input the third subset of the simulated user inputs to the application;
determining, before all of the third subset of the simulated user inputs have been input to the application, that the user has entered additional one or more actual user inputs; and
ceasing to input the any further simulated user inputs to the application.

10. The method of claim 1, further comprising:
placing the application in a known state before driving the application by inputting the second subset of the simulated user inputs to the application.

11. The method of claim 1, wherein inputting the second subset of the simulated user inputs to the application drives the application to a fourth application state.

12. A system, comprising:
one or more computers and one or more storage devices storing instructions that are operable, when executed by the one or more computers, to cause the one or more computers to perform operations comprising:
  selecting a feature of an application on a computing device to demonstrate;
  selecting simulated user inputs that, when input to the application, drive the application to demonstrate the selected feature;
  driving the application from a first application state to a second application state by inputting a first subset of the simulated user inputs to the application;
  determining, while the application is in the second application state, that a user has entered one or more actual user inputs, then ceasing to input any further simulated user inputs to the application, and driving the application from the second application state to a third application state by inputting one or more of the actual user inputs to the application; and
  determining that the user has not entered any further actual user inputs for a predetermined period of time, then driving the application by inputting a second subset of the simulated user inputs to the application.

13. The system of claim 12, wherein the simulated user inputs are selected, from among multiple sets of simulated user inputs, by a demonstration application of the computing device.

14. The system of claim 12, wherein the instructions, when executed by the one or more computers, cause the one or more computers to perform operations further comprising:
  in response to selecting the simulated user inputs, automatically obtaining real-time information, by the computing device; and
  before determining that the user has entered one or more actual user inputs, inputting the real-time information to the application.

15. The system of claim 14, wherein the real-time information comprises weather, location, time, sensor, or traffic information that is current when the simulated user inputs are selected.

16. The system of claim 12, wherein selecting the feature further comprises receiving a user input that references the feature.

17. The system of claim 12, wherein the instructions, when executed by the one or more computers, cause the one or more computers to perform operations further comprising:
  placing the application or computing device in a known state before beginning to input the first subset of the simulated user inputs.

18. The system of claim 12, wherein the instructions, when executed by the one or more computers, cause the one or more computers to perform operations further comprising:
  determining whether the selected feature is capable of being demonstrated from a current state of the application or computing device, before beginning to input the first subset of the simulated user inputs.

19. A computer-readable storage medium storing software comprising instructions executable by one or more computers which, upon such execution, cause the one or more computers to perform operations comprising:
  selecting a feature of an application on a computing device to demonstrate;
  selecting simulated user inputs that, when input to the application, drive the application to demonstrate the selected feature;
  driving the application from a first application state to a second application state by inputting a first subset of the simulated user inputs to the application;
  determining, while the application is in the second application state, that a user has entered one or more actual user inputs, then ceasing to input any further simulated user inputs to the application, and driving the application from the second application state to a third application state by inputting one or more of the actual user inputs to the application; and
  determining that the user has not entered any further actual user inputs for a predetermined period of time, then driving the application by inputting a second subset of the simulated user inputs to the application.

20. The medium of claim 19, wherein the instructions, when executed by the one or more computers, cause the one or more computers to perform operations further comprising:
  in response to selecting the simulated user inputs, automatically obtaining real-time information, by the computing device; and
  before determining that the user has entered one or more actual user inputs, inputting the real-time information to the application.

21. The medium of claim 20, wherein the instructions, when executed by the one or more computers, cause the one or more computers to perform operations further comprising:
  determining whether the selected feature is capable of being demonstrated from a current state of the application or computing device, before beginning to input the first subset of the simulated user inputs.

* * * * *